US007016909B2

(12) United States Patent
Chan et al.

(10) Patent No.: US 7,016,909 B2
(45) Date of Patent: Mar. 21, 2006

(54) METHOD AND SYSTEM FOR EXPANSION OF RECURRING CALENDAR EVENTS

(75) Inventors: Kok Wai Chan, Bellevue, WA (US); Dennis A. Kiilerich, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 10/162,322

(22) Filed: Jun. 4, 2002

(65) Prior Publication Data

US 2003/0225732 A1    Dec. 4, 2003

(51) Int. Cl.
*G06F 17/30* (2006.01)
(52) U.S. Cl. .................... 707/101; 707/1; 707/205
(58) Field of Classification Search .............. 707/1, 707/7, 101, 205; 705/8, 9
See application file for complete search history.

(56) References Cited

U.S. PATENT DOCUMENTS

| | | | |
|---|---|---|---|
| 4,658,351 A * | 4/1987 | Teng .................... | 718/103 |
| 5,692,125 A | 11/1997 | Schloss et al. | |
| 5,793,747 A * | 8/1998 | Kline .................... | 370/230 |
| 5,813,013 A | 9/1998 | Shakib et al. | |
| 5,893,073 A * | 4/1999 | Kasso et al. .................... | 705/8 |
| 6,016,478 A * | 1/2000 | Zhang et al. .................... | 705/9 |
| 6,360,217 B1 | 3/2002 | Gopal et al. | |
| 6,396,843 B1 * | 5/2002 | Chiussi et al. .................... | 370/418 |

* cited by examiner

*Primary Examiner*—Jeffrey Gaffin
*Assistant Examiner*—Haythim Alaubaidi
(74) *Attorney, Agent, or Firm*—Senniger Powers

(57) ABSTRACT

A system and method for expanding recurring calendar events such that the retrieval of recurring calendar appointments is expedited. A recurring appointment is saved as a data structure including a recurrence pattern. When a recurring appointment is saved by a client that has sufficient processing and memory resources to perform the computations necessary to expand recurring appointments (i.e., a thick client), a background thread is notified. The background thread increases its priority to normal when idle processing capacity is available and calls a routine requesting calendar information for a defined time period. The routine causes the expansion of the data structure into the individual instances of the recurring appointment for a defined time period, and the individual instances are saved for later retrieval. A later query from a client without sufficient processing and memory resources to perform the calculations necessary to expand recurring appointments (i.e., a thin client), therefore, does not require that the expansion computations be performed contemporaneously.

36 Claims, 6 Drawing Sheets

Fig. 3
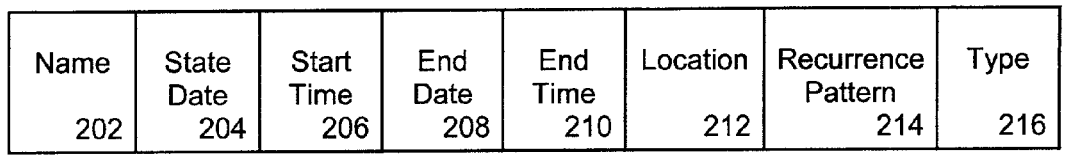
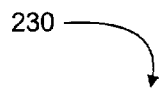
| | Name 202 | State Date 204 | Start Time 206 | End Date 208 | End Time 210 | Location 212 | Recurrence Pattern 214 | Type 216 |
|---|---|---|---|---|---|---|---|---|
| 232a | Marktg Meeting | Jan 6, 2002 | 10:00 a.m. | Jan 16, 2002 | 11:00 a.m. | Conf Room A | | Single |
| 232b | Dept Meeting | Jan 15, 2002 | 1:30 p.m. | Jan 15, 2002 | 2:30 p.m. | Building 4 | Weekly | Master A |
| | ... | ... | ... | ... | ... | ... | ... | ... |
| 232n | Mtng w/ Supplier | Jan 16, 2002 | 4:00 p.m. | Jan 16, 2002 | 4:30 p.m. | | | Single |
Fig. 4a

230

| | Name 202 | State Date 204 | Start Time 206 | End Date 208 | End Time 210 | Location 212 | Recurrence Pattern 214 | Type 216 |
|---|---|---|---|---|---|---|---|---|
| 232a | Marktg Meeting | Jan 4, 2002 | 10:00 a.m. | Jan 4, 2002 | 11:00 a.m. | Conf Room A | | Single |
| 232b | Dept Meeting | Jan 14, 2002 | 1:30 p.m. | Jan 14, 2002 | 2:30 p.m. | Building 4 | Weekly | Master A |
| 232c | Dept Meeting | Jan 14, 2002 | 1:30 p.m. | Jan 14, 2002 | 2:30 p.m. | Building 4 | | Instance of Master A |
| 232d | Dept Meeting | Jan 21, 2002 | 1:30 p.m. | Jan 21, 2002 | 2:30 p.m. | Building 4 | | Instance of Master A |
| 232e | Dept Meeting | Jan 28, 2002 | 1:30 p.m. | Jan 28, 2002 | 2:30 p.m. | Building 4 | | Instance of Master A |
| | ... | ... | ... | ... | ... | ... | ... | ... |
| 232n | Mtng w/ Supplier | Jan 16, 2002 | 4:00 p.m. | Jan 16, 2002 | 4:30 p.m. | | | Single |

| Name | January 254a | February 254b | March 254c | ... | 254n | Delete |
|---|---|---|---|---|---|---|
| Master A | 0 | 0 | 0 | ... | 0 | 0 |
| ... | ... | ... | ... | ... | ... | ... |
| Master n | 1 | 0 | 1 | ... | 0 | 0 |

Fig. 5b

| Name | January 254a | February 254b | March 254c | ... | 254n | Delete |
|---|---|---|---|---|---|---|
| Master A | 1 | 0 | 0 | ... | 0 | 0 |
| ... | ... | ... | ... | ... | ... | ... |
| Master n | 1 | 0 | 1 | ... | 0 | 0 |

METHOD AND SYSTEM FOR EXPANSION OF RECURRING CALENDAR EVENTS

TECHNICAL FIELD

This invention relates generally to computerized calendaring applications and more specifically to expansion of a recurring calendar entry into individual instances of the calendar entry for a defined time period prior to a user query to display the individual instances of the calendar entry.

BACKGROUND OF THE INVENTION

The use of software programs and computers for messaging, calendaring and collaborating is common today. For example, computer application programs exists that allow a user to send, receive and manage email messages, maintain personal or group calendars, schedule meetings with others, manage contacts, and maintain task lists. One example of such a program is OUTLOOK, manufactured by Microsoft Corporation of Redmond, Wash., although many other such programs are also available.

Application programs that allow messaging, calendaring and collaboration may reside and execute on a single computer as a stand alone program. Additionally, these application programs may act as a client to access information maintained by a much more advanced, server-based messaging, calendaring and collaboration application. One example of such an advanced program is Exchange 2000 Server, also manufactured by Microsoft Corporation. Using Exchange 2000 Server, for example, a plurality of users in a networked environment may maintain any number of individual or public email folders, calendars, task list, etc.

In a networked environment, a server based messaging, calendaring and collaboration program (e.g., Exchange 2000 Server) executes on a server which is networked to a plurality of personal computers running client programs (e.g., OUTLOOK). The clients can send and receive email, maintain calendars, maintain task lists, schedule meetings, etc. In such an implementation, the database containing the email(s), calendar(s), task list(s), etc. for each user may be maintained by the server, although the individual clients may have some control over the creation and management of the messages, management of the client mailbox, and so forth. The details of such an implementation are well known to those with ordinary skill in the art.

Generally, a program with calendaring capabilities allows two types of different appointments to be saved, modified or deleted. A first type of appointment is a single appointment with a single occurrence at a particular date and time. Such an appointment is comprised of a data structure that includes information about the appointment such as, but not necessarily limited to, a subject line, start and end times, date, and a note about the appointment. A second type of appointment is a recurring appointment. For example, a user may want to schedule a meeting on the first Monday of every month during the year. Instead of manually entering and saving twelve separate appointments, many calendaring programs allow a user to enter and save a single recurring appointment. The data structure associated with such an appointment includes all the information normally associated with a single appointment, as well as information about a recurrence pattern. The calendaring program, using the recurrence pattern, then computes and fills in the individual instances of the appointment. The manner in which the recurrence pattern is entered and used to expand the individual instances of the recurring appointment is well known to those with ordinary skill in the art. OUTLOOK and Exchange 2000 both allow a user to enter recurring appointments.

Messaging Application Program Interface (MAPI) defines a complete architecture for messaging applications. The architecture specifies several well-defined components known to those with ordinary skill in the art. The MAPI architecture can be used for email, scheduling, personal information managers, bulletin boards, and online services that run on mainframes, personal computers, and hand-held computing devices. On client computers, MAPI allows complete control over the messaging system, creation and management of messages, management of the client mailbox, service providers and so forth. The comprehensive architectural design allows MAPI to serve as the basis for a common information exchange. OUTLOOK and Exchange, for example, are programs that support MAPI.

Generally, a computer running a MAPI compliant client program has sufficient processing and memory resources to perform many of the tasks and computations associated with creation and management of the mailbox, calendar folder, messages, appointments, tasks, etc. A client program with access to sufficient processing and memory resources will herein be referred to as a thick client. When a client computer running a MAPI-compliant calendar program (e.g., OUTLOOK) accesses a server computer that maintains calendar information (e.g., Exchange 2000), the client computer receives from the server computer all of the data structures associated with a requested defined time period. If the requested defined time period (e.g., all calendar appointments for the month of March) includes one or more recurring appointments, the client computer calculates all of the instances of that appointment during the time period contemporaneous with the request. The individual instances of the recurring appointment are then displayed on an appropriate user interface. This process, however, does not involve delay that is typically noticeable to the user because the recurrence expansion calculations are usually performed by a desktop computer with its own processor and memory, and because none of the data (i.e., the data associated with the single appointments and the individual instances of the recurring appointments) are actually written to a hard disk.

It is also possible, however, to check email, calendaring and other information maintained by the server (e.g., Exchange 2000) using a client computer with relatively low processing and memory resources, i.e., a thin client. For example, a user may check email or calendar information remotely using a web browser running on a computer, or a portable device such a mobile phone or a handheld personal information manager (PIM). In such an implementation, the web browser (which would be the client), or cell phone or PIM would not have access to sufficient processing and memory resources to perform (or perform in a reasonable time) many of the more resource intensive tasks associated with managing messages, tasks, appointments, etc. (e.g., expanding a recurring appointment into the individual instances of the appointment).

Microsoft Corporation's Outlook Web Access, is a component of Exchange 2000 Server that allows users secure access to their email, calendar, group scheduling, and public folder information maintained by an Exchange 2000 Server through the internet using a web browser. Another example is a Mobile Information Server (also manufactured by Microsoft Corporation) which allows access to similar information via a cell phone or PIM. An example of a suitable web browser is Internet Explorer, version 5.0 or higher, manufactured by Microsoft Corporation. In these implementations, the client can display, add, modify or delete calendar information maintained by the server from any location using a wired or wireless Local Area Network or Wide Area Network.

The approach outlined above can cause significant delays for users that use both thick and thin clients to save, modify, delete or access appointment information on a server. For example, a user may make many additions to and/or modifications of recurring appointments using a thick client (e.g., using a desktop computer running OUTLOOK while at work). The individual instances of the recurring appointments will not be expanded and saved to disk at the time they were made. If the user then tries to access and view these recurring appointments using a thin client (e.g., via the internet using a web browser from home the next morning), all of the recurring appointments for the time period desired to be viewed will have to be expanded by the server at the time of the viewing because the thin client (e.g., the web browser) has limited processing and memory resources of its own. The server must compute the individual instances of the recurring appointment from the recurrence pattern and save the individual instances to a computer readable medium. These tasks are resource (e.g., processor and/or memory resources) and time intensive.

The expansion of recurring appointments at the time of the request could result in noticeable time delay from the time the request for calendar information is submitted by the thin client to the server, to the time that the information is displayed on the user interface of the thin client. This situation is made worse during peak hours when many users may be trying to access their calendar information from the server (for example, users trying to check their calendar from home in the morning before leaving for work). In fact, it is possible that in a worse case scenario, the client may time-out while waiting for the server to expand and save the recurring appointment data structures.

SUMMARY OF THE INVENTION

The present invention is directed to alleviating the delay associated with the expansion of recurring appointments when accessing calendar information. In one embodiment of the invention, a status message indicates whether a recurring appointment data structure has been expanded into the individual instances of the recurring appointment. When a recurring appointment is created, modified, or deleted using a thick client, a thread running on the server places the folder identification (FID) of the calendar folder in a queue of FIDs for calendar folders with recurring appointments that require expansion. A separate thread running at low priority on the server is then signaled. The priority of the thread is increased and, with respect to each calendar folder containing a recurring appointment that requires expansion, the thread calls a routine that causes the server to expand the recurring appointment(s) in the calendar folder, and the individual instances of the recurring appointment(s) are saved to a computer readable medium. In one embodiment of the invention, the separate thread calls the routine causing the expansion when the central processing unit of the server has extra or idle processing capacity. Thus, when a user later accesses the calendar information on the server, the recurring appointment(s) have already been expanded into individual instances of the appointment(s) and saved to a computer readable medium, and only need to be transmitted for display on an appropriate user interface. Accordingly, there is no delay associated with having to expand the recurring appointments and saving the results at the time the calendar information is requested by the client.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a schematic representation of a data structure saved in a calendar folder.

FIGS. 4a and 4b are schematic representations of a calendar folder prior to and after a Master has been expanded, respectively.

FIGS. 5a and 5b are schematic representations of a Status Message table prior to and after a Master has been expanded, respectively.

DETAILED DESCRIPTION OF THE INVENTION

Figure 1:
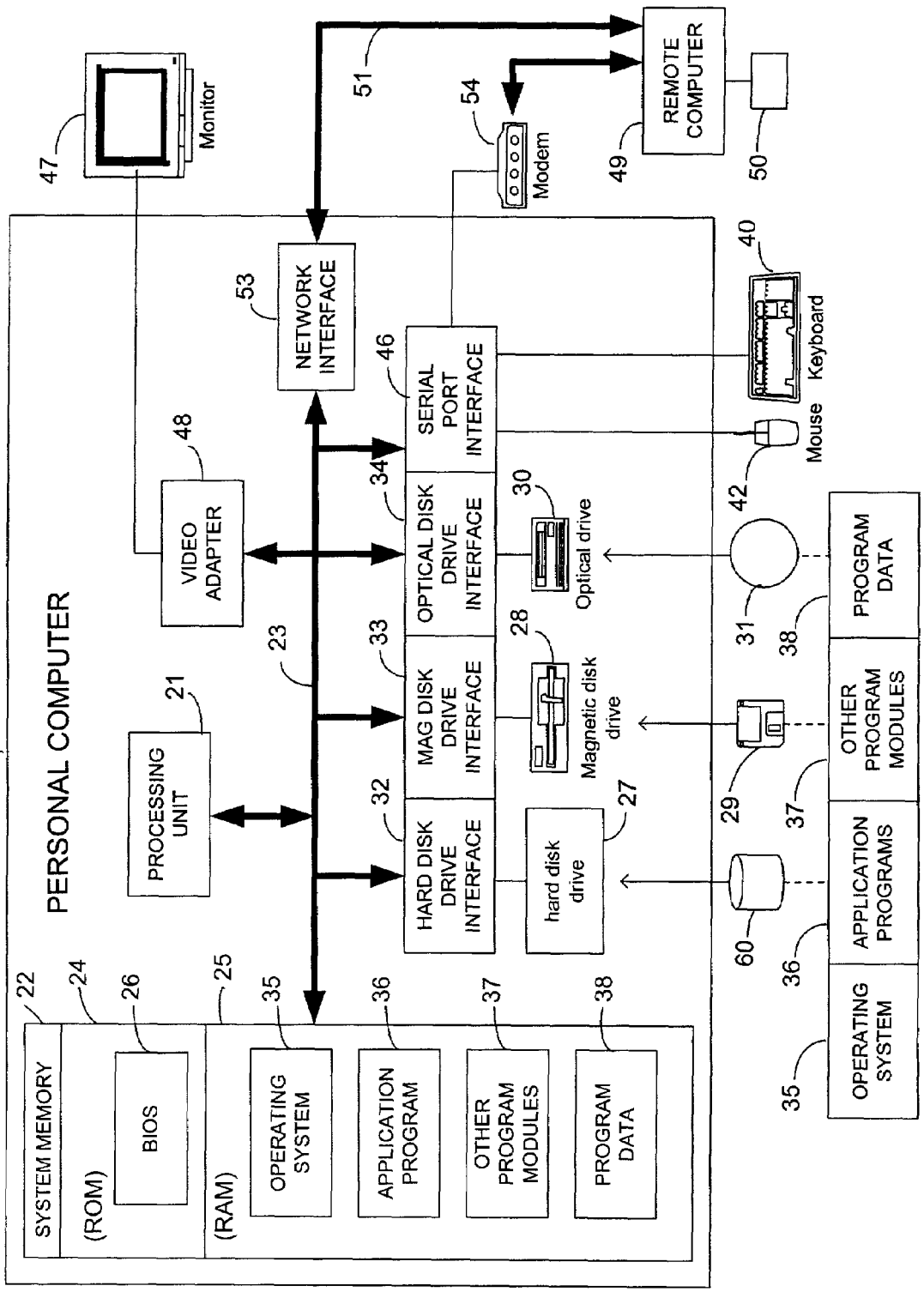
FIG. 1 is a block diagram of an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer and/or server. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. Additionally, the computer 20 may act as a server computer to one or more remote computers 49. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Additionally, the term appointment refers to any data structure stored by a calendaring program that includes at least a date, and/or time field. The phrase "recurring appointment" refers to an appointment that also includes a recurrence pattern. Although the specification generally refers to saving an appointment, the discussion is equally applicable to deleting and/or modifying data structures. Moreover, although MAPI is a standard set of functions developed by Microsoft Corporation, it is to be understood that the invention is not limited to the specific standard developed by Microsoft. Instead, the invention is broad enough to apply to any set of application program interfaces with the same set of functionalities as discussed herein.

Figure 2:
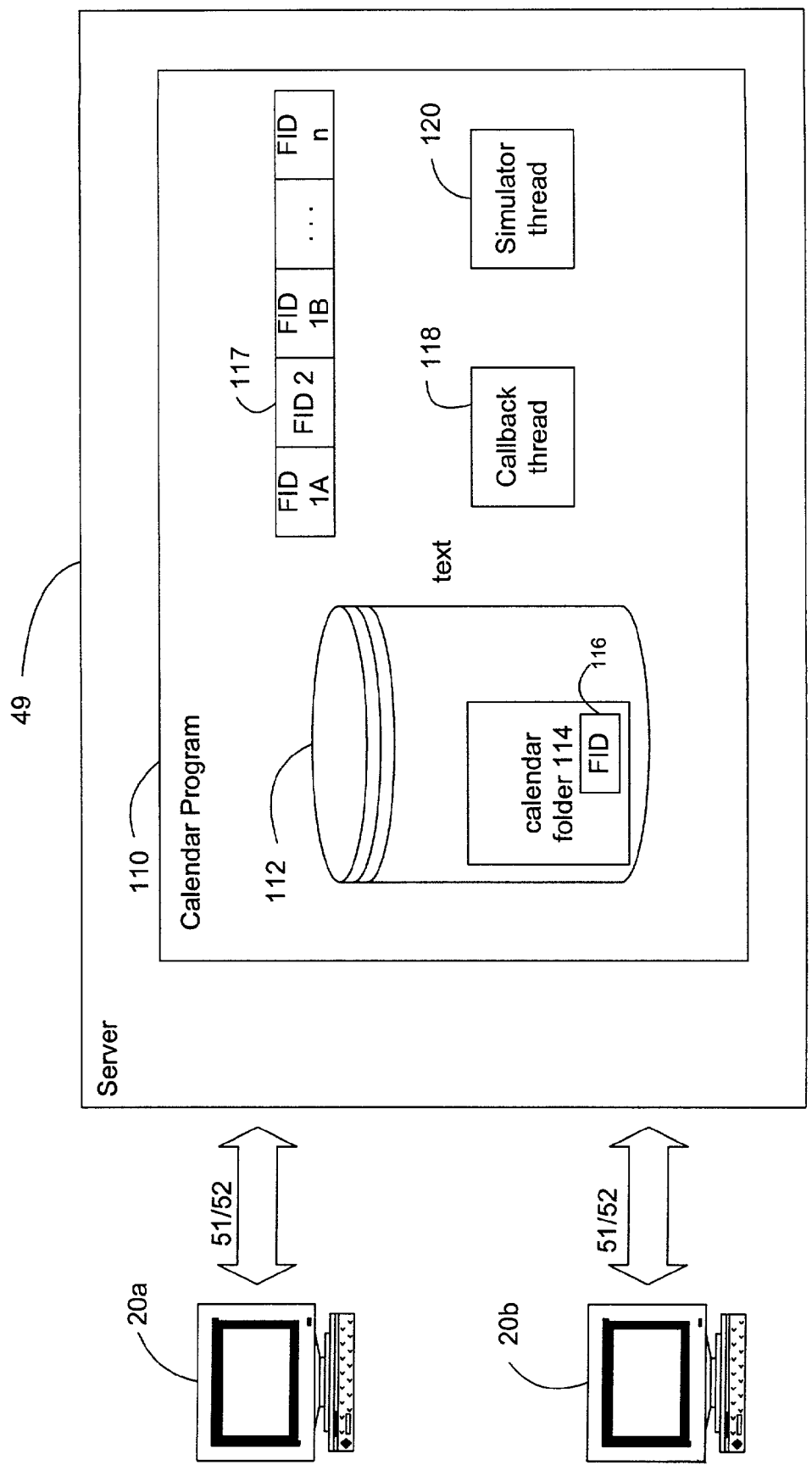
FIG. 2 is a block diagram of an exemplary system according to the invention.

FIG. 2 is a block diagram of an exemplary system according to the invention. As shown in FIG. 2, a server 49 may run a messaging, calendaring and collaboration program 110 (e.g., Exchange 2000 Sever). As this invention is generically applicable to any program that allows one or more users to maintain at least an electronic calendar, the messaging, calendar and collaboration program 110 running on the server 49 will herein be referred to as the calendar program 110. The calendar program maintains a main database 112 which includes information about the emails, calendar, tasks, notes, etc. of one or more users. The database 112 may be maintained on any computer readable medium, for example, a hard disk. In an Exchange 2000 implementation of the present invention, the main database 112 is referred to as the mail database.

The main database 112 includes one or more calendar folders 114. Each user may have one or more calendar folders 114. For example, a user may have a calendar folder for personal appointments and a calendar folder for business related appointments. Additionally, groups of users may share a calendar folder. Each calendar folder 114 has a folder identification (FID) 116 for identifying and locating the calendar folder. The calendar program 110 may also have a routine, herein referred to as Callback routine 118, which among other tasks, may place the FID 116 of a particular calendar folder in a queue 117 of calendar folders with recurring appointments that have to be expanded. The calendar program 110 also may include a separate, distinct thread (herein referred to as the Simulator thread 120) for calling a routine that causes the calendar program on the server to expand a recurring appointment into the individual instances of the recurring appointment. The Callback routine 118 may run on the same thread (which is different than the Simulator thread 120) as the calendar program 110. In an alternative embodiment, the Callback routine may run on its own separate thread. Thus, in such an implementation three, rather than two, separate threads would be running on the server. The Simulator thread 120 is further discussed in the proceeding sections.

The information maintained by the calendar program 110 in the one or more calendar folders 114, may be saved, modified, deleted or viewed by a client program or module 20*a* (shown in the figure running on a computer) with access to sufficient processing and memory resources to perform the computations necessary to expand the recurring appointment into the individual instances of the appointment (i.e., a thick client), instead of these computations being performed by the server. An example of such a thick client is a client program compatible with the MAPI protocol (e.g., OUTLOOK) running on a desktop computer. The information may also be saved, modified or deleted by a client program or module 20*b* (shown in the figure running on a computer) without access to sufficient processing and memory resources to perform the computations necessary to expand a recurring appointment into the individual instances of the appointment, wherein these computations have to be performed by the server (i.e., a thin client). An example of such a thin client is a web browser running on a computer when the web browser cannot or does not have access to sufficient processing and memory resources to perform the expansion computations. The web browser may, for example, use the hyper text transfer protocol (with or without Distributed Authoring and Versioning (DAV), also known as WebDAV) to communicate with the calendar program running on the server.

The clients 20*a* and 20*b* may communicate with the server 49 through a LAN or WAN, here identified as 51/52. Although FIG. 2 depicts computers 20 running client programs, the invention is broad enough to encompass any combination of hardware or software that acts as a client to the server, such as cell phones, pagers, or PIMS.

In the present invention, a thick client is one in which the client is capable of performing the calculations associated with expanding a recurring appointment into the individual instances of the appointment locally (i.e., on the device on which the client is running), instead of these computations being performed by the server. A thin client, however, is incapable of performing (or performing in a reasonable time) these calculations locally and, therefore, the calculations must be performed by the server and saved to a computer readable medium. For the purposes of the present invention and discussion, the preceding capability distinguishes a thick client from a thin client.

In one embodiment of the invention, the calendar program running on the server may determine whether the client is a thick client or a thin client based on the protocol that the client uses to communicate with the server. For example, as a matter of design choice, the calendar program may assume that clients using the MAPI protocol to communicate with the server are thick clients, whereas clients using HTTP (with or without DAV) to communicate with the server are thin clients. As another example, the server may poll the client for its capabilities or the client may provide this information to the server when first establishing a communication link. The invention, however, is not limited to any specific manner for determining the capabilities of the client. Additionally, although the MAPI protocol and HTTP are mentioned for illustrative purposes, the invention is broad enough to encompass any protocol used to communicate between the client and server.

FIG. 3 is a schematic representation of a data structure 200 representing an appointment saved in calendar folder 114 in the database 112 of the calendar program 110. The data structure 200 may includes one or more of the fields indicated: name of appointment 202, start date 204, start time 206, end date 208, end time 210, location of the appointment 212, recurrence pattern of the appointment 214, and instance type 216. A data structure 200 that includes a recurrence pattern (i.e., a data structure for a recurring appointment) is herein referred to as a Master. The instance type field 216 refers to whether the appointment is a single occurrence appointment, a Master, or an individual instance of a Master that has been expanded. The data structure 200 is not limited to this particular embodiment and may include and combination of the above fields or other additional fields.

FIG. 4*a* represents a table 230 of individual data structures 200 associated with a calendar folder 114, prior to expansion of any Masters. The columns of table 230 refer to the individual fields 202–216 of the data structure 200, and each row 232*a* through 232*n* represents a distinct data structure entry in the calendar folder. Letter subscripts are used with element numbers to identify more than one instance of the element, with the subscript n signifying that the invention does not limit the quantity of the element. Table 230 is intended as a general representation of the data in the calendar folder 114 and not as an exact physical or logical representation of how the data is actually stored or managed. In one embodiment of the invention, when using Outlook Web Access, each data structure is logically a separate file such that each appointment can be retrieved using a Uniform Resource Locator (URL) of the data structure.

The data shown in table 230 of FIG. 4*a* is representative of the data that may populate the data structures that comprise individual appointments in the calendar folder 114. Additionally, the table may contain any number and/or combination of single appointments, Masters, or individual instances of recurring appointments (i.e., individual instances of a Master that has been expanded).

In the representative table shown in FIG. 4*a*, Master A in row 232*b* has not been expanded into the individual instances of the recurring appointment. The table 230 shown in FIG. 4*b* is the same as in FIG. 4*a*, except that in this table the individual instances of Master A (column 232*b*) have been expanded and are indicated in rows 232*c*–232*e* of the table 230.

When a Master is created, modified or deleted, a Status Message indicates whether the Master has been expanded or not. As shown in FIGS. 5*a* and 5*b*, in one embodiment the Status Message may be implemented as a table 250. In such an embodiment, a row 252 is created for each Master in the calendar folder 114. The table may contain one or more columns 254, each column representing a defined time period. For example, each column may represent one month of the year. Each cell of the table may include a value indicative of whether the Master has already been expanded for the defined time period. If a Master has already been expanded for a particular month, the cell for that month may contain a value of 1. If the Master has not been expanded for the particular month, the cell may contain a value of 0. It is to be understood that the invention is not limited to this particular implementation of the Status Message. Rather, the invention is broad enough to encompass any implementation in which the calendaring program is capable of tracking whether a Master in a particular calendar folder has already been expanded into the individual instances of the appointment for a defined time period.

Figure 6:
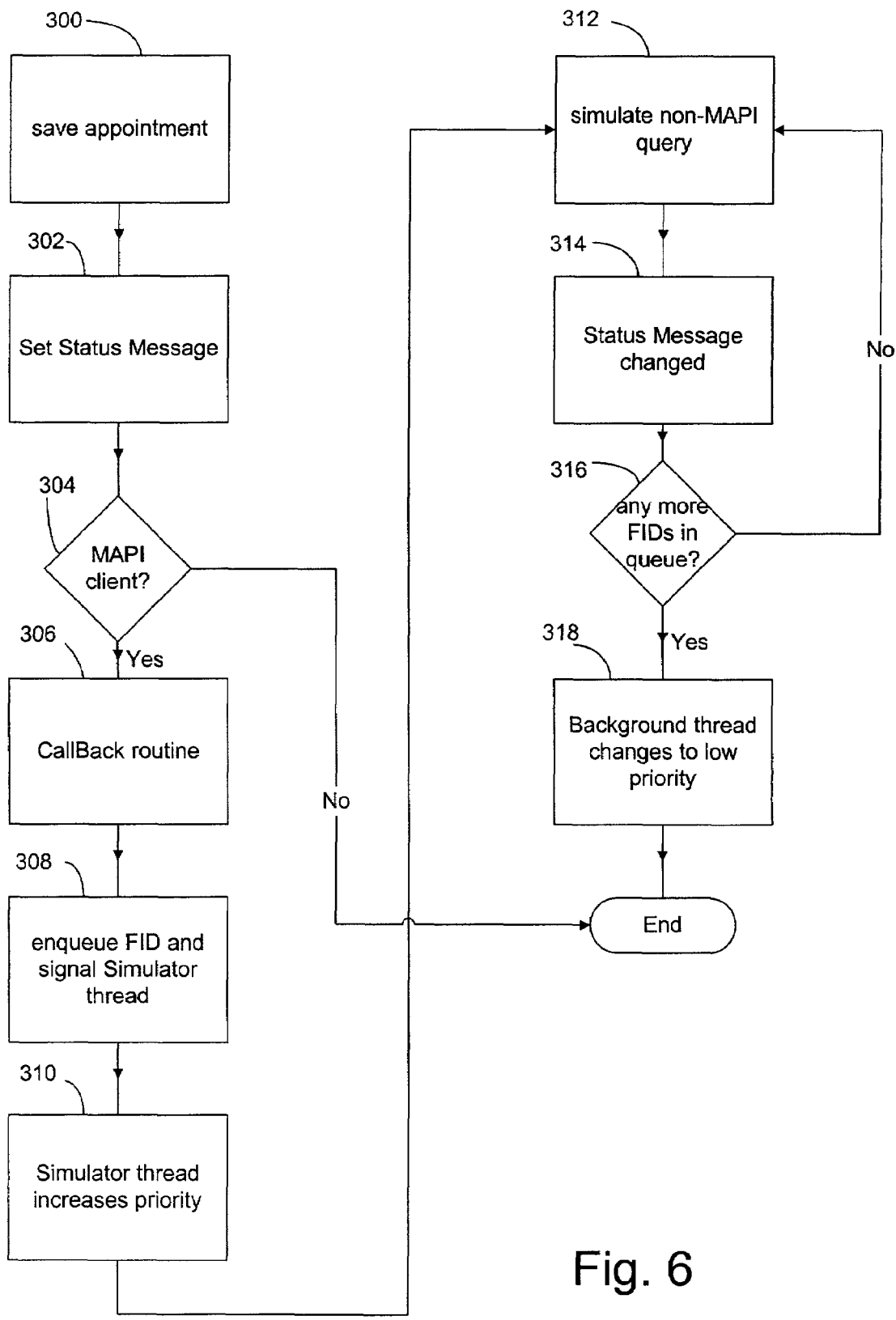
FIG. 6 is a flow chart representing the steps performed in one embodiment of the invention to expand an exemplary Master.

In one embodiment of the invention, the steps to expand an exemplary Master (herein referred to as Master A) are as follows. With respect to FIG. 6, at step 300 a client 20a saves a recurring appointment on the server 49. The recurring appointment is saved as Master A in row 232a in the table 230 in the calendar folder 114 of the main database 112. It is to be appreciated that the main database 112 may be located on a computer readable medium logically accessible to the server 49, irrespective of whether the computer readable medium is physically located in the server. Additionally, although the present discussion is with respect to a save operation (i.e., when a new recurring appointment is created and saved by a client), the invention is not limited to this operation. Indeed, the invention, and the steps of FIG. 6, are broad enough to apply to any operation that requires the instances of recurring appointments or their content to change. Such operations include, but are not limited to, operations that save, modify or delete Masters.

At step 302, the Status Message is set to indicate that Master A has not been expanded. In the embodiment of the Status Message shown in FIG. 5a, row 252a is created for Master A and the values of the cells in the row are set to 0. If at step 300 an already expanded Master was modified, at step 302 the appropriate cells in the row associated with the modified Master are changed to indicate that the Master has not been expanded from the time of the modification. As a result, the individual instances of the modified Master will be recomputed. If at step 300 a client deleted a recurring appointment, i.e., deleted a Master, the Status Message of the Master is set to indicate that the instances of the Master should be deleted. In the embodiment shown in FIGS. 5a and 5b, a delete column 256 indicates whether a Master should be deleted. Thus, when a user deletes a Master, the delete column for the Master is changed to 1 from 0.

At step 304 the calendaring program 110 determines whether the save (or modify or delete) operation was performed from a thick client or a thin client. If the save operation was performed from a thin client, no further action is taken according to the invention and Master A may be expanded immediately as a consequence of an immediate query by the thin client for the instances of the recurring appointment. The specific steps performed in this eventuality are well known to those with ordinary skill in the art. If the save operation was performed by a thick client, at step 306 the Callback routine 118 is called.

At step 308, the Callback routine 118 places the FID 116 of the calendar folder 114 in a queue 117 of calendar folders that contain Masters that require expansion. In one embodiment of the invention, the C++ Standard Template Library is used to implement the queue and place the FID in the queue, although any suitable queue implementation may be used. At step 308 the Callback routine 118 also signals the Simulator thread 120 that a calendar folder requiring expansion has been placed in the queue 117.

In one embodiment of the invention, the Callback routine may also place the calendar folder's FID in a set (not shown) of FIDs indicative of calendar folders in the expansion queue 117. In such an embodiment, prior to placing the FID in the queue, the Callback routine 118 checks the set of FIDs to determine whether the calendar folder is already in the queue. If the FID is already in the queue, the Callback routine does not place the FID in the queue again. In an alternate embodiment of the invention, instead of placing the FID 116 of the calendar folder 114 in a queue, a pointer or identifier (not shown) specifically pointing to or identifying the Master that requires expansion is placed in the queue 117.

The Simulator thread 120 normally runs in a low priority in the hierarchy of threads that are running on the server 49. In one embodiment of the invention, the Simulator thread 120 is created when the calendar program 110 starts executing on the server 49 and is terminated when the calendaring program is shut down.

At step 310 the priority of the Simulator thread is increased. For example, the Simulator thread's priority may be changed to normal or high, depending on the particular implementation of the invention and design choice. In one embodiment of the invention, the priority of the Simulator thread is increased, and the remaining steps performed, when the server has idle or extra processing capacity.

At step 312, the Simulator thread 120 calls a routine (not shown) that causes the server to expand the Master for a defined time period. The routine causes the server to expand the Master(s) that have not already been expanded and save the individual instances of the expanded Master(s) in rows 232 of table 230 in calendar folder 114. If the client has deleted a Master, the routine called by the Simulator thread deletes all instances of the Master from the table 230 in the calendar folder 114, and also deletes the row 252 corresponding to the Master from table 250.

In one embodiment, the Simulator thread requests from the routine the least amount of information necessary to cause the routine to expand the Master. The invention is broad enough to encompass any defined length of time. For example, the Simulator thread may request all Masters in the next 24 hours, the current month, the current calendar year, the proceeding twelve months, etc. In one embodiment, the time period may be all months included in the next 30 days (which in the right circumstances could comprise as many as three different months).

FIG. 4b depicts a representative table 230 in the calendar folder 114 after Master A has been expanded for the month of January according to step 312. The individual instances of Master A for January are saved in rows 232c–232e.

At step 314, the Status Message for Master A is changed to indicate that Master A has been expanded and saved in the calendar folder 114. With reference to FIG. 5b, for example, the Status Message for Master A in January is changed to 1, indicating that all instances for Master A for January have been expanded and saved to disk.

Although not shown as a separate step in FIG. 6, the FID of the calendar folder is also removed from the queue when the Status Message is changed. If the set indicative of FIDs in the queue has been implemented, the FID of the calendar folder is also removed from the set. If only a pointer or identifier to the Master was placed in the queue, then this pointer or identifier is removed from the queue.

At decision step 316, the Simulator thread determines if there are any additional FIDs 116 in the queue 117 of calendar folders with Masters that require expansion. If so, steps 312 and 314 are repeated for these additional calendar folders 114. In one implementation, the queue 117 is a first in, first out queue. If no other FIDs 116 are in the queue 117, at step 316 the priority of the Simulator thread is reverted to a lower priority. The Simulator thread will remain in a low priority until the next time the Callback routine 118 signals the Simulator thread 120.

With the present invention, when a thin client queries calendar information saved on a server by a thick client, the Masters may have already been expanded into individual instances of the recurring appointments and saved to a computer readable medium. When receiving the query, the server checks the Status Message to ensure that all Masters in the calendar folder have been expanded for a defined time period. Because the Masters have already been expanded, the single appointments and individual instances of Masters are transmitted to the client and displayed on an appropriate user interface. Accordingly, the delay associated with expanding the Masters and saving the individual instances to the calendar folder contemporaneous with the client request is eliminated.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. As another example, the functionalities of the Callback and Simulator threads may be performed by a single thread.

Although the specification discusses an implementation in which a single server is used, those with ordinary skill will recognize that the system and method of the present invention may be implemented using a plurality of servers. Additionally, the database 112 may be implemented on a separate file server. Other multiple server implementations are also intended to be encompassed by the invention.

Additionally, even though the specification refers to certain software applications available commercially, the invention is not limited to these named applications or the current version of these applications. Rather, these applications are mentioned for illustrative purposes and the invention is broad enough to encompass any combination of software and hardware with the functionalities described herein.

What is claimed is:

1. A method of expanding a master data structure including a recurrence pattern into individual instances of a recurring appointment according to the recurrence pattern for a defined time period, comprising:
   placing an identifier identifying a calendar folder containing the master data structure in a queue for further processing;
   signaling a first thread having a priority level, the priority level being a first priority level that the calendar folder containing the master data structure is queued for further processing;
   changing the priority level of the first thread from the first priority level to a second, higher priority level;
   calling a first routine for expanding the master data structure;
   saving the individual instances of the recurring appointment to the calendar folder on a computer readable medium; and
   calling a second routine to perform the steps of placing the identifier in the queue and signaling the first thread.

2. The method of claim 1, wherein the second routine executes in a separate thread.

3. The method of claim 1, further comprising saving the calendar folder containing the master data structure in the computer readable medium, wherein the calendar folder containing the master data structure is saved to the computer readable medium based on a request from a thick client.

4. The method of claim 3, wherein the thick client is compliant with the MAPI architecture.

5. The method of claim 1, wherein the first thread performs the step of calling the first routine.

6. The method of claim 5, wherein the first thread calls the first routine by simulating a query from a thin client.

7. The method of claim 6, wherein the thin client is a web browser.

8. The method of claim 1, wherein the first priority level of the first thread is a low priority level.

9. The method of claim 1, wherein the second priority level of the first thread is a normal priority level.

10. The method of claim 1, wherein the second priority level of the first thread is a high priority level.

11. The method of claim 1, wherein the steps of changing the priority level and calling the first routine occur when idle processing capacity is available.

12. A system for expanding a master data structure including a recurrence pattern contained in a calendar folder maintained by a server executing a calendaring application into individual instances of a recurring appointment, comprising,
   a database logically accessible to the calendaring application on the server for maintaining the calendar folder;
   a status message implemented by the calendaring application, the status message indicating whether the calendar folder contains the master data structure that requires expanding;
   a first thread executing at a low priority level on the server; and
   a first routine for computing the individual instances of the recurring appointment from the recurrence pattern of the master data structure;
   saving the individual instances in the calendar folder, wherein the first thread calls the first routine;
   and wherein the priority level of the first thread is increased; and
   calling a second routine for signaling the first thread that the calendar folder contains the master data structure that requires expansion.

13. The system of claim 12, wherein the second routine executes in a separate thread.

14. The system of claim 12, wherein the first thread calls the first routine by simulating a query from a thin client.

15. The system of claim 12, wherein the priority level of the first thread is increased prior to the first thread calling the first routine.

16. A system for expanding a master data structure including a recurrence pattern contained in a calendar folder maintained by a server executing a calendaring application into individual instances of a recurring appointment, comprising,
   a database logically accessible to the calendaring application on the server for maintaining the calendar folder;
   a status message implemented by the calendaring application, the status message indicating whether the calendar folder contains the master data structure that requires expanding;
   a first thread executing at a low priority level on the server; and
   a first routine for computing the individual instances of the recurring appointment from the recurrence pattern of the master data structure; and
   saving the individual instances in the calendar folder, wherein the first thread calls the first routine; and
   wherein the priority level of the first thread is increased prior to the first thread calling the first routine and when idle processing capacity is available on the server.

17. The system of claim 16, wherein the priority level of the first thread is increased to normal.

18. The system of claim 16, wherein the priority level of the first thread is increased to high.

19. The system of claim 16, wherein the first thread calls the first routine by simulating a query from a thin client.

20. A method of expediting the display of recurring calendar information on a thin client, comprising:
   detecting whether a master data structure including a recurrence pattern of a recurring appointment was saved by a thick client;
   placing the calendar folder including the master data structure in a queue of calendar folders requiring further processing;
   signaling a simulator thread running in the background that the calendar folder has been placed in the queue;
   increasing a priority level of the simulator thread;
   expanding the master data structure into individual instances of the recurring appointment;
   saving the individual instances of the recurring appointment to a computer readable medium;
   receiving a calendar query from a thin client for a defined time period;
   checking the status message to ensure that the master data structure has already been expanded into the individual instances of the recurring appointment for the defined time period; and
   returning the individual instances of the recurring appointment within the defined time period to the thin client without expanding the master data structure contemporaneously with the request.

21. The method of claim 20, further comprising changing a status message associated with the master data structure to indicate that the master data structure has to be expanded.

22. The method of claim 21, further comprising changing the status message associated with the master data structure to indicate that the master data structure has been expanded.

23. A method of expanding a master data structure including a recurrence pattern into individual instances of a recurring appointment according to the recurrence pattern for a defined time period, comprising:
   placing an identifier identifying the master data structure in a queue for further processing;
   signaling a first thread having a priority level, the priority level being a first priority level that the master data structure is queued for further processing;
   changing the priority level of the first thread from the first priority level to a second, higher priority level;
   calling a first routine that expands the master data structure;
   saving the individual instances of the recurring appointment to a computer readable medium; and
   calling a second routine to perform the step of placing the identifier in the queue and signaling the first thread.

24. The method of claim 23, wherein the first thread calls the first routine that expands the master data structure.

25. The method of claim 23, wherein the first thread calls the first routine by simulating a query from a thin client for calendar information for a defined time period.

26. The method of claim 25, wherein the thin client is a web browser.

27. The method of claim 23, wherein the first priority level of the first thread is a low priority level.

28. The method of claim 23, wherein the second priority level of the first thread is a normal priority level.

29. The method of claim 23, wherein the second priority level of the first thread is a high priority level.

30. A method of expanding a master data structure including a recurrence pattern into individual instances of a recurring appointment according to the recurrence pattern for a defined time period, comprising:
   placing an identifier identifying the master data structure in a queue for further processing;
   signaling a first thread having a priority level, the priority level being a first priority level that the master data structure is queued for further processing;
   changing the priority level of the first thread from the first priority level to a second, higher priority level;
   calling a first routine that expands the master data structure;
   saving the individual instances of the recurring appointment to a computer readable medium; and
   wherein the steps of changing of the priority level and calling the first routine occur when idle processing capacity is available.

31. The method of claim 30, wherein the first thread calls the first routine that expands the master data structure.

32. The method of claim 30, wherein the first thread calls the first routine by simulating a query from a thin client for calendar information for a defined time period.

33. The method of claim 32, wherein the thin client is a web browser.

34. The method of claim 30, wherein the first priority level of the first thread is a low priority level.

35. The method of claim 30, wherein the second priority level of the first thread is a normal priority level.

36. The method of claim 30, wherein the second priority level of the first thread is a high priority level.

* * * * *